US008484205B1

(12) United States Patent
Cohen

(10) Patent No.: US 8,484,205 B1
(45) Date of Patent: Jul. 9, 2013

(54) SYSTEM AND METHOD FOR GENERATING SOURCES OF PRIORITIZED CONTENT

(75) Inventor: Nathan Matthew Cohen, Austin, TX (US)

(73) Assignee: OneSpot, Inc., Austin, TX (US)

( * ) Notice: Subject to any disclaimer, the term of this patent is extended or adjusted under 35 U.S.C. 154(b) by 168 days.

(21) Appl. No.: 12/838,671

(22) Filed: Jul. 19, 2010

Related U.S. Application Data

(62) Division of application No. 11/545,875, filed on Oct. 11, 2006, now Pat. No. 7,761,423.

(60) Provisional application No. 60/725,726, filed on Oct. 11, 2005.

(51) Int. Cl.
*G06F 7/00* (2006.01)
*G06F 17/00* (2006.01)
*G06F 17/30* (2006.01)

(52) U.S. Cl.
USPC .......................... 707/726; 707/637; 707/723

(58) Field of Classification Search
None
See application file for complete search history.

(56) References Cited

U.S. PATENT DOCUMENTS

| | | | | |
|---|---|---|---|---|
| 6,463,430 | B1 * | 10/2002 | Brady et al. ........................... | 1/1 |
| 6,513,051 | B1 * | 1/2003 | Bolosky et al. ....................... | 1/1 |
| 6,539,395 | B1 * | 3/2003 | Gjerdingen et al. .................. | 1/1 |
| 6,594,654 | B1 * | 7/2003 | Salam et al. ......................... | 1/1 |
| 6,675,170 | B1 * | 1/2004 | Flake ................................... | 1/1 |
| 6,721,741 | B1 * | 4/2004 | Eyal et al. ............................ | 1/1 |
| 6,735,585 | B1 * | 5/2004 | Black et al. .......................... | 1/1 |
| 6,785,688 | B2 * | 8/2004 | Abajian et al. ................. | 707/700 |
| 6,847,977 | B2 * | 1/2005 | Abajian ........................ | 709/223 |
| 7,096,214 | B1 * | 8/2006 | Bharat et al. ................... | 707/708 |
| 7,308,643 | B1 * | 12/2007 | Zhu et al. ....................... | 715/206 |
| 2003/0172075 | A1 * | 9/2003 | Reisman ......................... | 707/10 |
| 2005/0038809 | A1 * | 2/2005 | Abajian et al. ................. | 707/102 |
| 2005/0060162 | A1 * | 3/2005 | Mohit et al. ...................... | 705/1 |
| 2005/0187965 | A1 * | 8/2005 | Abajian ........................ | 707/102 |
| 2005/0222989 | A1 * | 10/2005 | Haveliwala et al. .............. | 707/3 |
| 2007/0073845 | A1 * | 3/2007 | Reisman ........................ | 709/219 |
| 2007/0078811 | A1 * | 4/2007 | Balasubramanian et al. .... | 707/2 |
| 2008/0046948 | A1 * | 2/2008 | Verosub ........................ | 725/117 |
| 2009/0043723 | A1 * | 2/2009 | Hino ................................. | 706/46 |
| 2010/0057801 | A1 * | 3/2010 | Ramer et al. ................... | 707/728 |

OTHER PUBLICATIONS

Rada Milhalcea; PageRank on Semantic Networks, with Application to Word Sense Disambiguation; 2004; University of North Texas; pp. 1-7.*
Sergey Brin and Lawrence Page, "The Anatomy of a Large-Scale Hypertextual Web Search Engine" (extended web version), 20 pages, 1998.
Sergey Brin and Lawrence Page, "The Anatomy of a Large-Scale Hypertextual Web Search Engine," Computer Networks and ISDN Systems 30, pp. 107-117, 1998.

(Continued)

*Primary Examiner* — Shew-Fen Lin
*Assistant Examiner* — Jermaine Mincey
(74) *Attorney, Agent, or Firm* — Campbell Stephenson LLP

(57) ABSTRACT

The system provides a technique for finding relevant content and content sources based on the aggregation and analysis of individual indications of relevance. The system identifies and provides selections of relevant content. It may comprise a selection acquisition subsystem, a selection network repository subsystem, a scoring engine, and a recommendation engine, and is used to generate sources of content comprising sets of prioritized links directed to a topic or community of interest.

19 Claims, 10 Drawing Sheets

OTHER PUBLICATIONS

Loren Terveen: "Constructing, Organizing, and Visualizing Collections of Topically Related Web Resources"; ACM Transactions on Computer-Human Interaction, vol. 6, No. 1, pp. 67-94, 1999.

Taher H. Haveliwala, "Efficient Computation of PageRank," Standford University (Oct. 18, 1999), pp. 1-15.

A. Josang and R. Ismail, "The Beta Reputation System," 15th Bled Electronic Commerce Conference—e-Reality: Constructing the e-Economy, Bled, Slovenia (Jun. 17-19, 2002), pp. 1-14.

R. Guha, "Open Rating Systems," Technical Report, IBM Research, Almaden, CA and Stanford Knowledge Systems Lab, Stanford, CA, 10 pages, 2003.

R. Guha., et al., "Propagation of Trust and Distrust," IBM Almaden Research Center, New York, New York (WWW 2004, May 17-22, 2004, pp. 403-412).

Scott Golder and Bernardo A. Huberman, "The Structure of Collaborative Tagging Systems," published on the arXiv e-print service (http://arxiv.org), arXiv:cs/0508082v1, 8 pages, 2005.

Paolo Massa and Conor Hayes, "Page-reRank: using trusted links to re-rank authority," *IEEE / WIC / ACM International Conference on Web Intelligence 2005*, pp. 614-617 (7 pages), 2005.

Gabe Rivera, "Why Does Memeorandum Exist?," Sep. 12, 2005, downloaded from http://news.techmeme.com/050912/why-does-memeorandum-exist, 3 pages.

Michael Arrington, "Memeorandum Is Exceptional," Sep. 18, 2005, TechCrunch, downloaded from http://techcrunch.com/2005/09/18/memeorandum-is-exceptional/, 3 pages.

Dan Farber, "Daylife's Rather Lifeless News Aggregator," ZDNet, Jan. 4, 2007, downloaded from http://www.zdnet.com/blog/btl/daylifes-rather-lifeless-news-aggregator/4225, 4 pages.

Adario Strange, "What Makes Techmeme Tick? Inventor Gabe Rivera Explains," Wired.com, May 17, 2007, downloaded from http://www.wired.com/print/techbiz/media/news/2007/05/techmeme, 2 pages.

Saul Hansell, "The Robot in the Newsroom," New York Times, Nov. 1, 2007, 2 pages.

"NYTimes.com Launches Enhanced Technology Section," New York Times, press release, Nov. 1, 2007, 1 page.

Michael Arrington, "TechMeme Finally Adds Search," TechCrunch, May 20, 2008, downloaded from http://techcrunch.com/2008/05/20/techmeme-is-finally-searchable/, 3 pages.

Erick Schonfeld, "Techmeme Search Feeds. Use 'Em, Love 'Em.," TechCrunch, Jun. 5, 2008, downloaded from http://techcrunch.com/2008/06/05/techmeme-search-feeds-use-em-love-em/, 3 pages.

Claire Cain Miller, "Techmeme Offers Tech News at Internet Speed," New York Times, Jul. 11, 2010 (as corrected, Jul. 13, 2010), 4 pages.

"Techmeme," Wikipedia, Aug. 20, 2010, downloaded from http://en.wikipedia.org/w/index.php?title=Techmeme&printable=yes, 2 pages.

"Blogrunner," web page, downloaded Aug. 23, 2010 from http://www.blogrunner.com/, 2 pages.

"Blogrunner—About," web page, downloaded Aug. 23, 2010 from http://www.blogrunner.com/w/out/faq.html, 2 pages.

"Techmeme," web page ("About" link selected), downloaded Aug. 23, 2010 from http://techmeme.com/, 7 pages.

* cited by examiner

SYSTEM AND METHOD FOR GENERATING SOURCES OF PRIORITIZED CONTENT

CROSS-REFERENCE TO RELATED APPLICATIONS

This application is a divisional application of U.S. application Ser. No. 11/545,875 (now U.S. Pat. No. 7,761,423), filed Oct. 11, 2006 by inventor Nathan Matthew Cohen and titled "System and Method for Generating Sources of Prioritized Content," which claimed the benefit under 35 U.S.C. §119(e) of U.S. Provisional Application No. 60/725,726, filed Oct. 11, 2005 by inventor Nathan Matthew Cohen and titled "System and Method for Indexing a Network of Interrelated Elements." The entire contents of each of these applications are hereby incorporated by reference for all purposes, as if fully set forth herein.

BACKGROUND OF THE INVENTION

The World Wide Web is a source of overwhelming information overload. Current search engines do a good job in finding pages that are relevant to a keyword search, but suffer from major drawbacks, including: (1) they do not work for content that does not have keywords or for which keywords are a poor description; (2) they do not work well for timely or brand new content; (3) they are typically not personalized—they treat each Web user as an equal. A solution that addresses these problems would be extremely useful.

Search engines index hundreds of millions or more web pages to make content accessible to users. Some search engines have maintained indices of web sites that were developed and maintained by individuals to make content more accessible to persons seeking the content. However, the ability of any given set of individuals to maintain comprehensive and up-to-date indices is limited. As the number of sources of digital content available on the Internet or in other networks and databases continues to grow at an increasing rate, indices of sites managed and maintained by persons who evaluate and classify each site have become unworkable.

The well-known search engine Google was developed, employing an iterative algorithm to calculate a "Page Rank" based, in part, on the link structure and anchor text of web links, to identify those pages that are most highly linked and prioritize search results. Details regarding this algorithm and its operation are discussed in the paper by Sergey Brin and Lawrence Page titled "The Anatomy of a Large-Scale Hypertextual Web Search Engine," which is incorporated by reference herein. The Page Rank algorithm assigns a greater value to those pages that are more frequently linked to than other pages that are less frequently linked to, thereby employing the structure of the Internet itself to prioritize the results of keyword searches. This approach has enjoyed considerable success at indexing the Internet. However, the Page Rank algorithm has several shortcomings. In particular, it is not well suited to finding content that has recently been added to the Internet, but has not persisted long enough for many others to link to it. In addition, to achieve high quality results, the Page Rank algorithm is dependent on generating an maintaining a citation (link) graph of a substantial portion of the entire Internet, which, even in an automated system, can require considerable time and enormous computing resources. While theoretical models have been proposed to improve the efficiency of PageRank, indexing the entire Internet remains an inherently resource intensive task. See e.g. Haveliwala, T., "Efficient Computation of Page Rank." In addition, the prioritization approach used by the Page Rank algorithm, while very useful at prioritizing pages that have the greatest number of links in the Internet as a whole, and presumably greater interest to the population as a whole, is not personalized.

Another drawback of the PageRank algorithm is that it fails to discriminate between links that are referential, endorsing, or criticizing. The PageRank algorithm considers all links into a page to be a vote for that page, even though many links to a given page may, in fact, be critical of or otherwise suggest that the content of a given page is untrustworthy. Proposals to extend the linking language of the Internet to accommodate such notions of trusted and untrusted links have been proposed by Hayes, C., in his article "Page-reRank: using trusted links to re-rank authority," which is incorporated herein by reference. Such approaches would require the wide-scale adoption of changed practices, and fail to address the situation in which given users or communities of interest have different criteria for determining which content is more trustworthy than other content.

There has been research in the area of rating and recommendation systems pertaining to the use and propagation of trust as a device to develop improved ratings and recommendations. See e.g. Guha, R. et al., "Propagation of Trust and Distrust"; see also Guha, R., "Open Rating Systems." However, such technologies typically have not been applied to processing sources of content or generating sources of content.

A system has been proposed in which persons give explicit ratings to each element in a network to improve the quality of content delivered to users. See Josang, A., and Ismail, R., "The Beta Reputation System." While useful for some applications, many users, particularly consumers of information will not take time to offer explicit ratings by which elements of content may be scored. A system that scores the elements without requiring user ratings of all the elements is desirable.

Syndication formats or protocols allows content providers to publish, and users to subscribe to content that is posted to web-sites. RSS, or "Really Simple Syndication," is an example of one such protocol that uses an XML-based system to allow users to receive content automatically. Such syndication formats may provide selected content, links to content, and metadata about the linked content. User programs, including browsers, feed reader, aggregators, and the like enable users to download the content that has been added to a feed on demand or periodically. The content delivered by web feeds is typically webpage content, but may also include links to other webpages, images, audio, image, and video content, or other kinds of digital information.

RSS 2.0 organizes the data in its feeds into channels, which typically comprise one or more items. The items, in turn, comprise links and metadata, which may include such information as title, description, date of publication, and the author or source of the content. Other syndication formats, such as Atom 1.0, are evolving and contain similar types of structure for syndicating collections of links to content and metadata about those links. These various syndication formats, including not only the versions of RSS, but also versions of the Atom format and other syndication format or protocols are commonly referred to as RSS feeds. The term RSS feed, as used in this specification, should be understood to broadly encompass these and other syndication formats or protocols.

Subscribing to a syndicated web publication or feed has the advantage that content that has recently been added by the publisher, blogger, portal operator, or other feed provider, is immediately accessible to subscribers. Moreover, since the subscriber presumably has chosen to subscribe to a given feed due to an interest in its content, feeds are a useful technology for receiving desired content, and, depending on the process by which a particular feed was assembled, might reflect a degree of personalization on the part of those who edit the feed. But, due to the vast and increasing number of sources of feeds and related content, monitoring a large set of feeds to identify relevant content remains a burdensome problem.

Tags are a mechanism that can be used to store metadata about the elements of a network, such as the digital data content to which the links of web pages, RSS and other feeds, queries, databases, email messages and the like may refer. See e.g. Golder, S. et al., "The Structure of Collaborative Tagging Systems." In recent years, tagging sites that provide a capability for users to manage a collection of bookmarks and keyword or other information relating to Internet sites have become popular. These sites can be a useful source of content because they contain information that an individual has designated a specific set of links to be trustworthy, and because the links are stored with metadata about the items to which the links refer. Tags or entries are also employed by feeds, which typically contain header information and several tags or entries which include one or more uniform resource locators or links and predefined fields of metadata corresponding to those URLs.

SUMMARY OF THE INVENTION

Throughout this disclosure, unless the context dictates otherwise, the word "comprise" or variations such as "comprises" or "comprising," is understood to mean "includes, but is not limited to" such that other elements that are not explicitly mentioned may also be included. Further, unless the context dictates otherwise, use of the term "a" may mean a singular object or element, or it may mean a plurality, or one or more of such objects or elements.

The system provides a technique for finding relevant content and content sources based on the aggregation and analysis of individual indications of relevance. The system identifies and provides selections of relevant content. It comprises a selection acquisition subsystem, a selection network repository subsystem, a scoring engine, and a recommendation engine.

A network of selections is a map of selectors and selections where each selector represents some entity that can be interpreted as selecting one or more selections. A selection can in turn be a selector. For example, a selector could be:
(1) a web page with hypertext links, where the selections could be other pages that the page links to; (2) a writer, and the selections could be the articles that writer has written; (3) a photographer, and the selections could be the photos that photographer has taken; (4) an editor, and the selections could be the writers and photographers that editor prefers; (5) an online news source, and the selections could be the editors that news source employs. The network can also consist of nodes of various types, which can be used to change the results of the system. For example: editors, writers, photographers, photos and pages. When a selector selects a selection, the selector can be said to "point to" or "trust" the selection. The selection can also be referred to as the "target".

Using a set of nodes that have been designated as trusted, the system identifies sources of content that are likely to be trusted and selections of content that are linked to by the nodes or sources of content. The system scores the sources of content and identifies a set of relevant selections, which themselves are scored based on their relationship to the sources of content. Having established a scored set of selections, the system can then provide recommendations of selections as output based on customizable criteria.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF THE PREFERRED EMBODIMENTS

Figure 1:
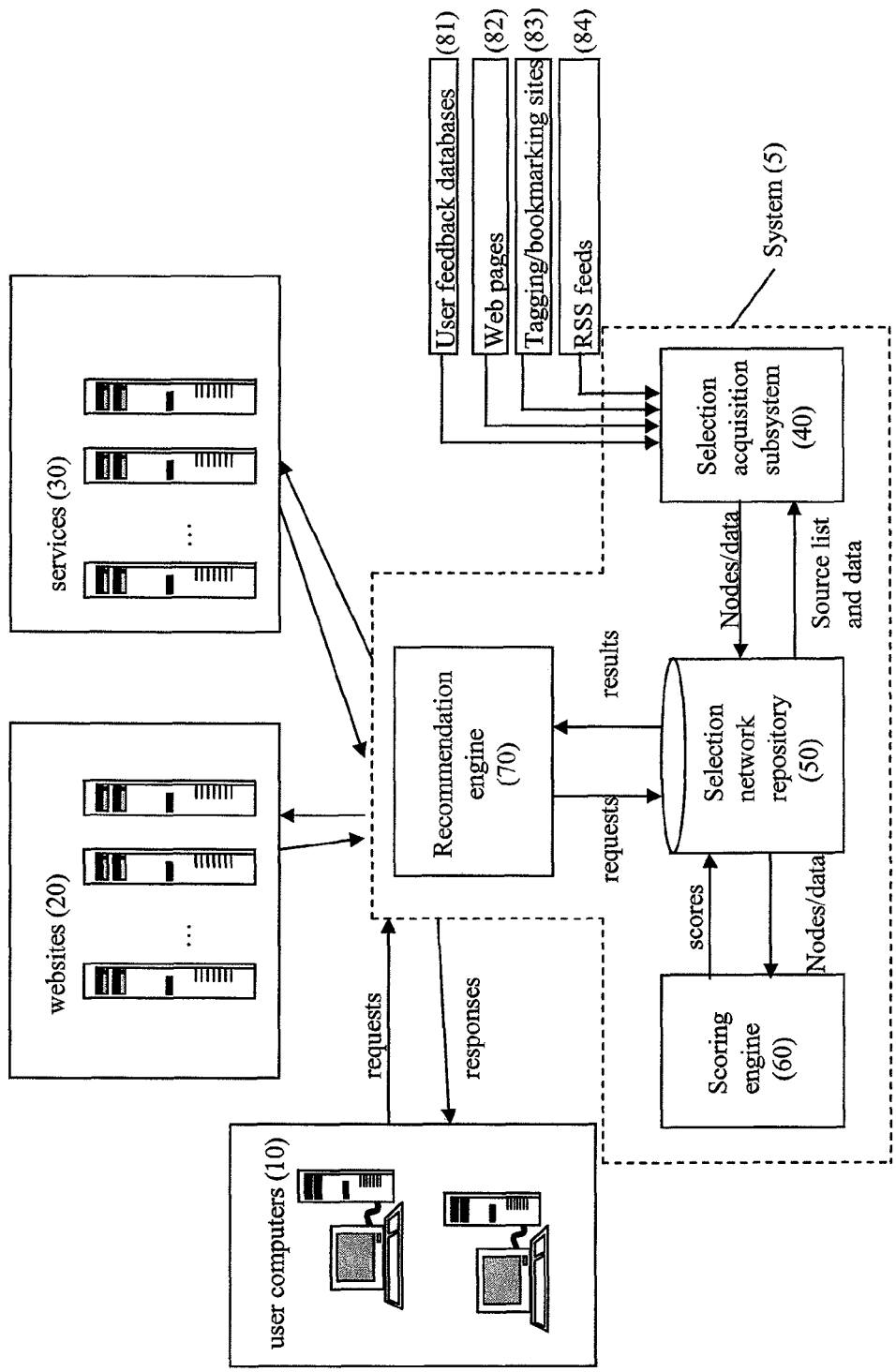
FIG. 1 is a logical diagram depicting an embodiment of the system

The system generates sets of selections of content that may be provided to users, websites, services, or other consumers of such selections as described below. FIG. 1 illustrates a logical diagram of an embodiment of the system. As shown in FIG. 1, users, operating user computers (10), websites (20), and other services (30) such as email listserves or other content distribution services may interact with the system (5) to receive selections of content provided by the system (5). According to a preferred embodiment, the system (5) includes a selection acquisition subsystem (40) that acquires selections of content and makes them available to the system, a selection network repository (50), that receives and stores the selections, information about the selections, and configuration information used in the operation of the system (5), a scoring engine (60) that assigns scores to sources of content and selections based on customizable criteria, and a recommendation engine (70) that assembles sets of content selections based on their scores and other criteria to generate system output. Also depicted in FIG. 1 are exemplary sources of content including user feedback databases (81), web pages (82), tagging/bookmarking sites (83), and RSS feeds (84). These and other sources of content are accessible to the selection acquisition subsystem (40) as set forth below.

Figure 8:
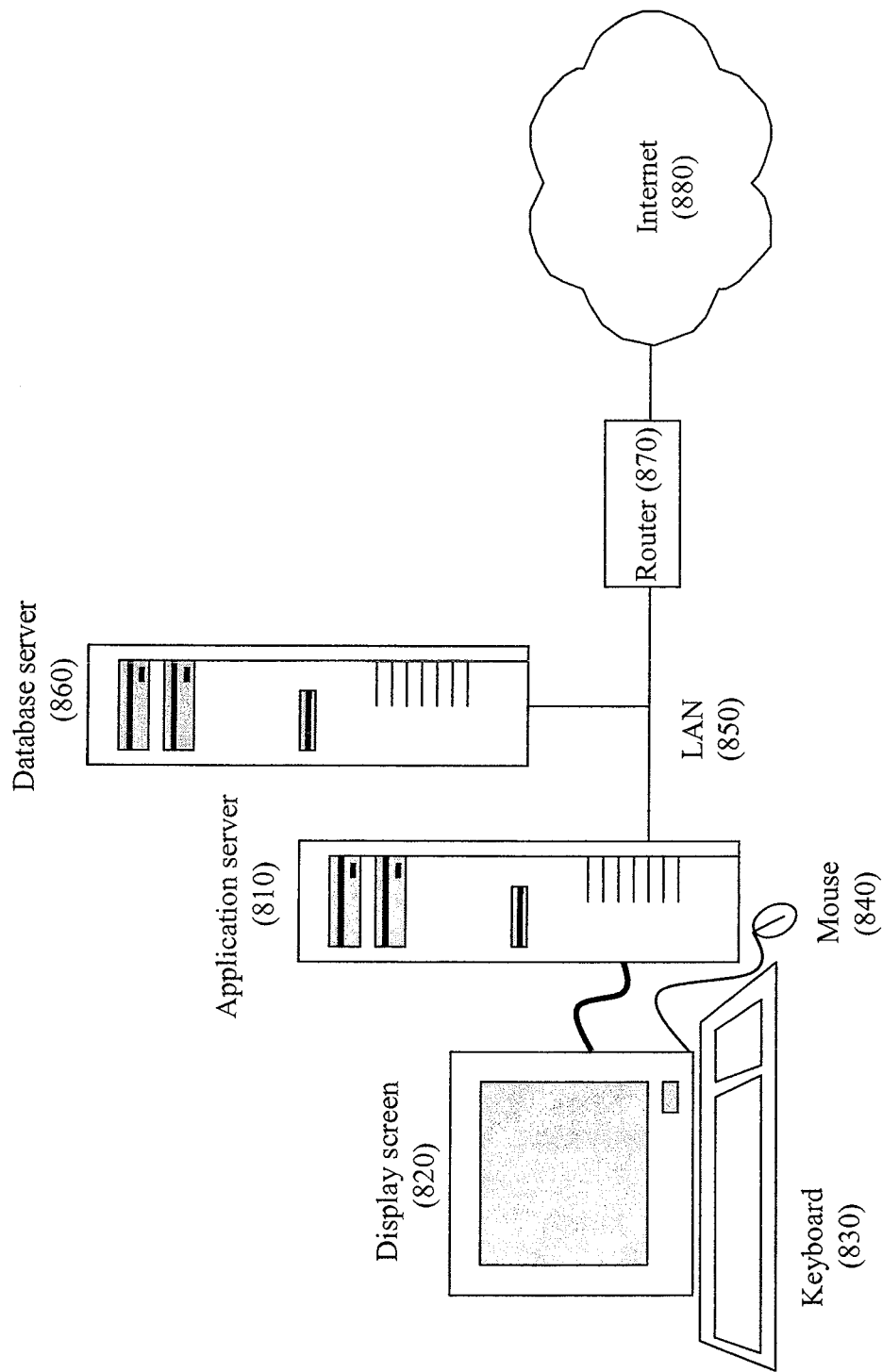
FIG. 8 depicts a network of computers on which computer instructions execute in accordance with an embodiment of the system.

The computer instructions that constitute the system may be stored in one or more computer memories, including fixed or removable disks, volatile or non-volatile semiconductor memories, optical or magnetic storage media, storage networks, or other known storage systems or storage media for computer data and instructions. In one embodiment, the computer instructions of the selection acquisition subsystem (40), the scoring engine (60), and the recommendation engine (70) operate on an application server, shown in FIG. 8, that includes a large server computer (810), display screen (820), keyboard (830), and a mouse (840). The application server is coupled to a local area network or LAN (850) using a network interface as is known in the art. In this embodiment, a second database server (860), also coupled to the local area network (850), stores the selection network repository (50) including the content selections, information about the content selections including their relationship to their sources, scores assigned to them by the scoring engine (60), and control and status information that is used by the other parts of the system. The LAN (850) is connected to a router (870) which provides a connection to an Internet Service Provider (ISP) to provide accessibility to the Internet (880). Techniques for connecting computers and networks to the Internet, to intranets, or to other networks in which the system operates are known.

The system (5) could be installed on a single computer, in which case it would preferably include user input/output devices such as one or more display screens, printers, faxes, email servers, keyboards, mice, touch screens or the like. Alternatively, the system (5) could be distributed over a plurality of computers, including a plurality of computers to execute the computer instructions of the selection acquisition subsystem (40), the scoring engine (50), and the recommendation engine (70), and a plurality of computers to store the network repository. The decision of how to partition and deploy the system (5) is a design choice that would depend of factors affecting cost and performance for a specific system implementation.

Selection Acquisition

In order for the system (5) to provide content, it acquires a set of selections that serves as a reservoir of content that may be provided to generate output for users, web sites, services, or other applications that receive output from the system. Sources of content abound on the Internet, including web sites, RSS and other types of feeds, other types of subscription services, results of queries from search engines, keyword search results from clipping services, tagging and bookmarking websites, email messages and listserve postings and the like. Additional sources of content may include information retrieved from intranets, or databases including third party databases or user-feedback databases, or user computers.

Figure 2A:
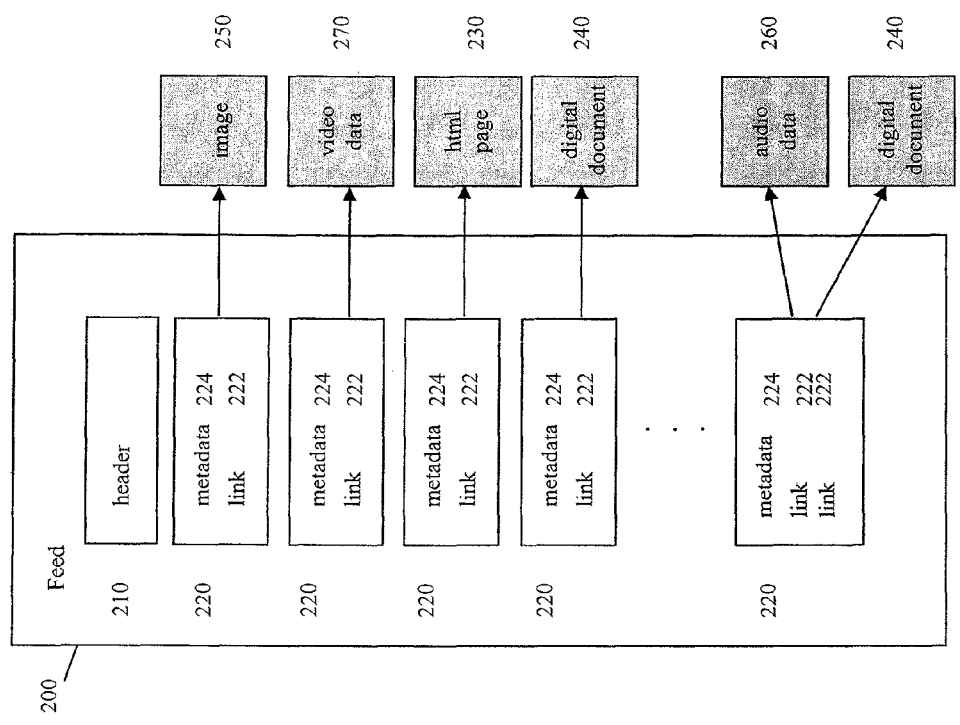
FIG. 2A depicts a feed

Sources of content contain one or more entries or "tags" that might be relevant to a given user. For example, a feed, such as shown in FIG. 2a, typically contains a header (210) and a set of one or more tags or entries (220), each entry including one or more links (222) (e.g. URLs), and metadata (224) associated with the links (222). The links (222) found in the entries (220) of a typical feed most frequently point to html pages (230), but may point to other digital documents (240), to images (250), to audio data (260), to video data (270), or to other digital content accessible via the network. The term "link" generally refers to a reference to a particular resource and includes URLs, which typically reference Internet resources, but also includes URIs, and other identifiers such as database references which uniquely identify a resource in a database.

Such sources of content may be downloaded based on editorial selection of a person using the system (5), and stored in the selection network repository (50) using the selection acquisition subsystem (40) to provide content containing selections. The user may make such selections locally, at a site where one or more components of the system (5) are installed, or remotely, via a network connection, such as the Internet. Preferably, the selection acquisition subsystem (40) automatically accesses a set of feeds or other sources of content and downloads them to provide content containing selections to the system.

Figure 3:
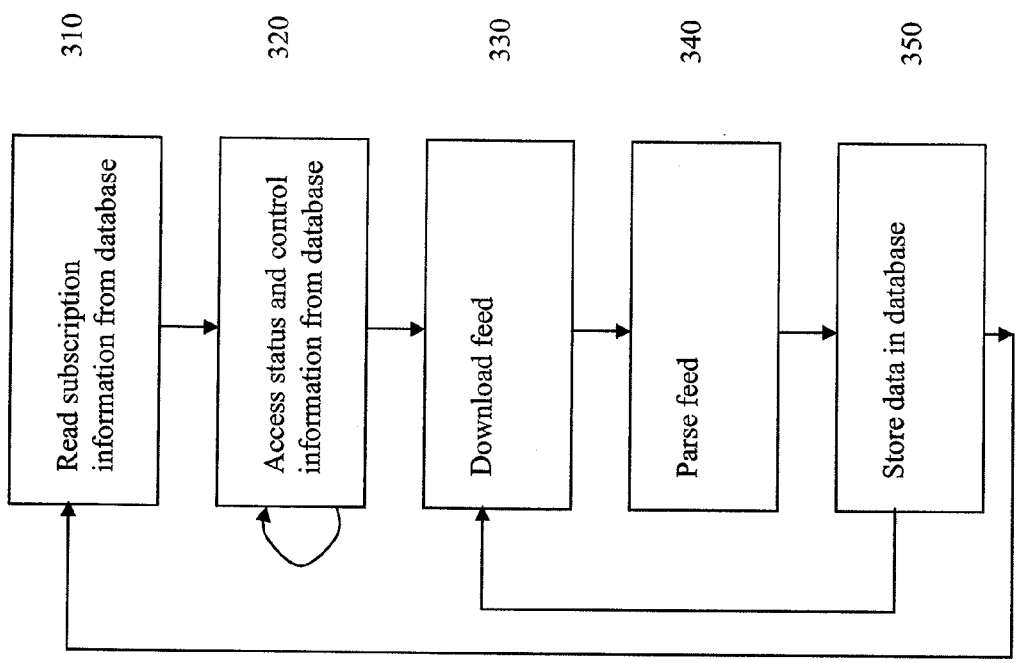
FIG. 3 depicts steps performed by the selection acquisition subsystem in accordance with an embodiment of the system.

According to one embodiment, as illustrated in FIG. 3, the selection acquisition subsystem (40) is a web crawler that accesses (310) a database of subscription information storing previously identified feeds or other sources of content to be downloaded. The selection acquisition subsystem (40) may also access (320) status and control information such as download policy data, download priority data, download schedule data, to control the process of downloading information. The web crawler downloads feeds (330) according to a schedule. Alternatively, the system may download sources of content other than feeds, or a combination of different types of sources of content. In a preferred embodiment, the system uses information regarding the frequency with which the sources of content to be downloaded have been updated, to more efficiently schedule downloads. In some embodiments, the web crawler may use priority data to influence the sequencing of downloads. The web crawler may download feeds or other sources of content individually or in batches.

After a source of content has been downloaded, the selection acquisition subsystem (40) parses (340) the source of content. In the case of a feed (200), the header (210), and each of the entries (220) is identified and processed. This enables the selection acquisition subsystem (40) to capture the features of the network of interrelationships between the feed (200), its entries (220) and links (222), and the items (e.g. html pages (230), digital documents (240), images (250), video data (270), audio data (260)) to which the links point. The data is then stored (350) in a database so that the selections contained in the feed can be made available to the system. In accordance with one embodiment, the database is the selection network repository (50).

Specific metadata indicating authorship, the time at which the feed and entries were created, descriptions, and possibly a level of trust or distrust in the target item of the links or items corresponding to an entry may be stored in the selection network repository (50).

The selection acquisition subsystem (40) repeats the process as needed to download the feeds on the subscription list. In a preferred embodiment, the subscription acquisition subsystem (40) determines when a downloaded feed has been updated and determines whether to increase or decrease the interval between downloads for that feed. This download interval is preferably stored in a database.

As described above, the selection acquisition subsystem (40) downloads sources of content that are stored in the database. These sources may have been inserted in the database by a user using the selection acquisition subsystem (40). In a preferred embodiment, the system also includes an auto-discovery capability to identify additional feeds to be downloaded and add them to the database. For example, if a link (222) of one of the entries (220) of a feed (200) that is downloaded refers to another feed, the system may add this feed to the subscription list. If an html page (230), or digital document (240) contains a link that refers to a feed, the system may add this feed to the subscription list. Similarly, if the html page (230) contains a link to another html page (231) containing a link to a feed, this feed may also be added to the subscription list. Preferably, the number of levels of indirection is limited to avoid adding irrelevant or less trustworthy feeds to the system. In this fashion, the subscription acquisition subsystem (40) can rapidly increase the available set of sources of content available to the system while managing the growth of system resources required to operate the system. External sources of feeds may also be imported by the system to rapidly expand the set of sources available to the network repository.

Figure 2B:
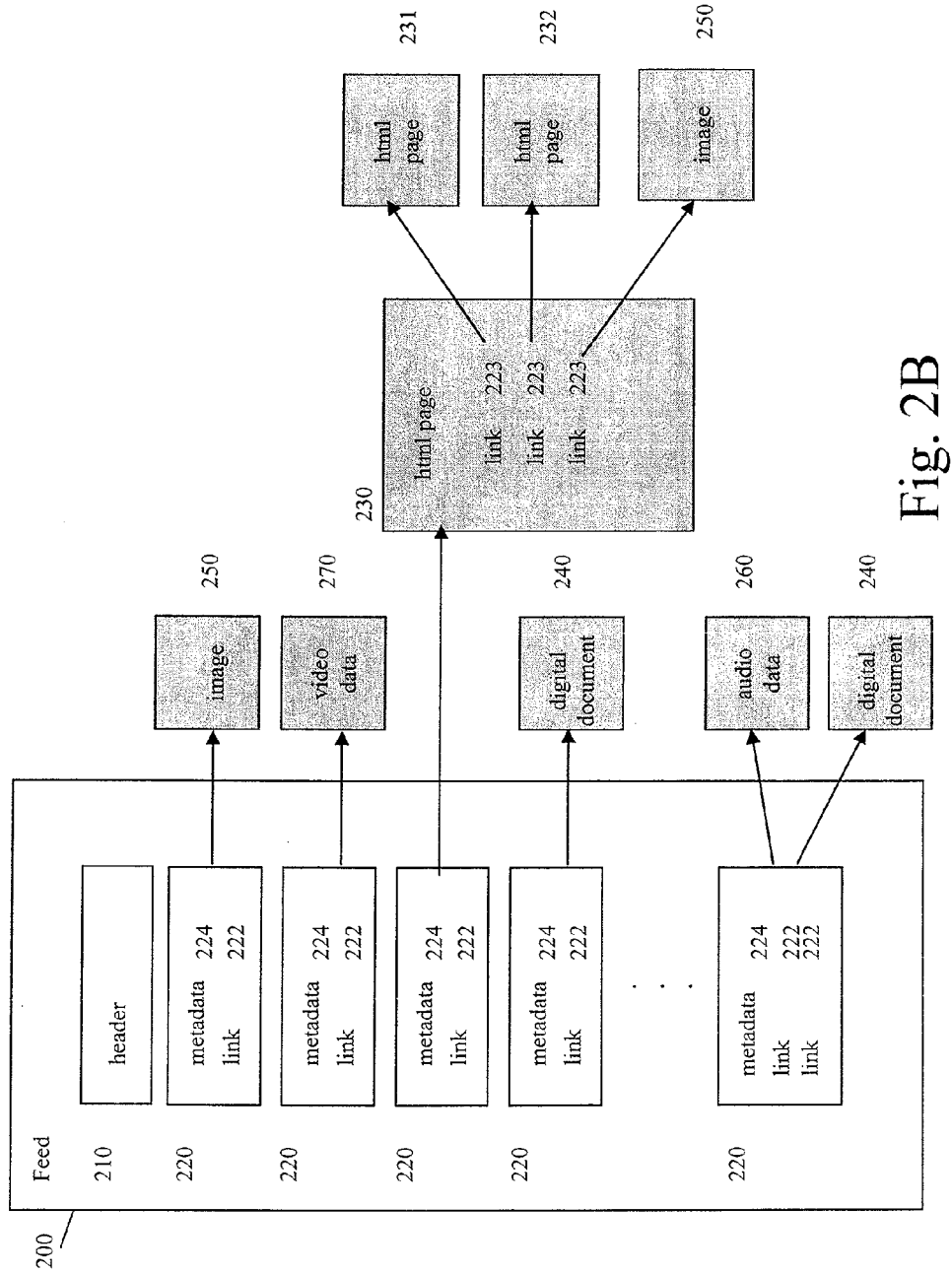
FIG. 2B depicts a feed and an entry page with links to additional items in accordance with an embodiment of the system.

A source of content, such as the feed of FIG. 2a, contains a set of links. The specific links in a feed may change over time, as its author adds new entries and removes old entries. The selection network repository (50) maintains records of such links over time, enabling the system to identify content that was previously recommended by a given feed, and its author, in addition to content that is presently recommended. The fact that a given source of content linked to a particular item can be evidence that the author of that source of content found this item to be relevant or trustworthy. This is particularly likely to be true where the author of the source of content is also the author of the item. For this reason, it can be advantageous for the selection acquisition subsystem (40) to acquire not only the entries of a given feed, but also the links found on the item to which these entries link, as illustrated in FIG. 2b. FIG. 2b reproduces FIG. 2a, but expands the html page (230) to show several links (223) found on the html page. In this illustration, the three links (223) of the html page (230) point to different html pages (231) and (232), and to an image (250). The html page (230) is referred to as an entry page, because a link to html page (230) can be found in an entry (220) of the feed (200). In accordance with a preferred embodiment, the web crawler not only captures the link to the entry page, html page (230), but also the links (223) found on the entry page and attributes links (223) to feed (200), and the entry (220) corresponding to the entry page (223).

The selection acquisition subsystem (40) may also operate to receive user feedback regarding the recommended selections. Users may reference links or content in a number of different ways. For example, a user may access a link, forward a link, interact with the system to provide feedback by expressing approval of or disapproval of a link, and the like. In one embodiment, a user feedback feed is created for a user, for which the feed's entries comprise selections that the user has read, forwarded, or given express approval or disapproval. The user feedback feed also stores metadata, such as the type of action performed by the user, so the system can determine whether to increase or decrease the value attributed to a given entry. Every time a user reads an item, the system may create an entry in that user's feed. This link can be given a lower weighting than if a link is created explicitly by the user. Alternatively, this capability can be implemented as a feature or module in software for reading content, such as a Web browser or RSS feed reader. In some cases, user feedback can be attributed to distrust rather than to trust, such as, for example, when the user expressly indicates distrust of a given author, feed, or item. In such instances, the user feedback feed may store the level of trust or distrust with the other metadata of the corresponding entry.

Selection Network Repository

The selection network repository (50) stores the selections of content that are acquired by the selection acquisition subsystem (40). This enables the scoring engine (60) and the recommendation engine (70) access to a repository of content from which relevant subsets of selections may be then be assembled. The selection network repository (50) stores entries, links, and relationships between them and the sources of content from which they were acquired. The selection network repository (50) also stores scores created by the system and may store feeds created by the system, such as the user feedback feed discussed above. The selection network repository (50) may also be used as a data store for status and control information related to the operation of the system. The selection network repository may, in some instances, store the actual content items (e.g. html pages, audio files, image files, video files, digital documents) themselves.

The selection network repository (50) may also operate as a front-end to one or more additional sources of selections. In this fashion, a third party who captures a network of sources, entries, links, items, and their relationships to one another, may integrate its data into an instance of the system to take advantage of the system features and data stored in the selection network repository. Such an application would be applicable where it is desired not to replicate all of the data in the third-party's database.

In a preferred embodiment, the selection network repository (50) comprises a database of tables, including a subscription table for storing control and status information used by the selection acquisition subsystem to manage the process of downloading and processing sources of content, an entry table that stores links to individual items such as web pages, audio or video files, and other digital content, as well as metadata pertaining to the links or content, a join table to map entries in the entry table to the sources of content from which they originate, a URL table for storing the uniform resource locators or other links such as database references of the entries, and a URL reference table that maps the entries of the entry table to the entries in the URL table.

The selection network repository (50) may be constructed using any type of database, including but not limited to flat file, hierarchical, relational, object oriented, or other database structures as are known in the art, or in other types of data stores, such as a computer memory, ensemble of files, or the like. The data of the database may be stored in any other data store, such as a computer memory, ensemble of files or the like.

Scoring Engine

Networks are sets of interrelated nodes. A set of interrelated nodes within a network is, itself a network. In accordance with one embodiment of the invention, the system assigns a score to each node (selector or selection) in the network. A global score can be obtained, or a score can be calculated from the standpoint of a set or subset of the nodes in the network. This score can then be used in various ways to select nodes of interest.

Figure 4B:
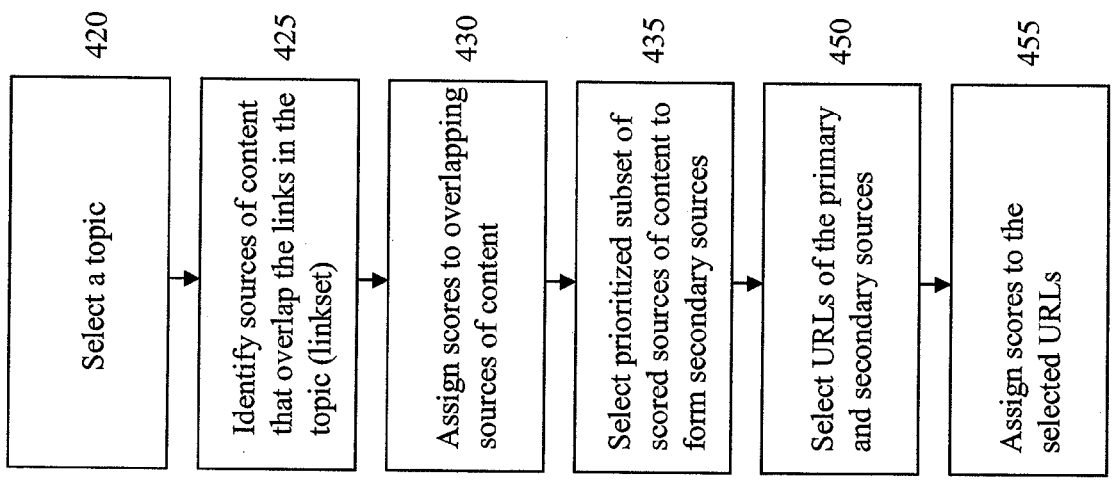
FIG. 4B depicts steps performed by the scoring engine in accordance with an embodiment of the system.
Figure 4A:
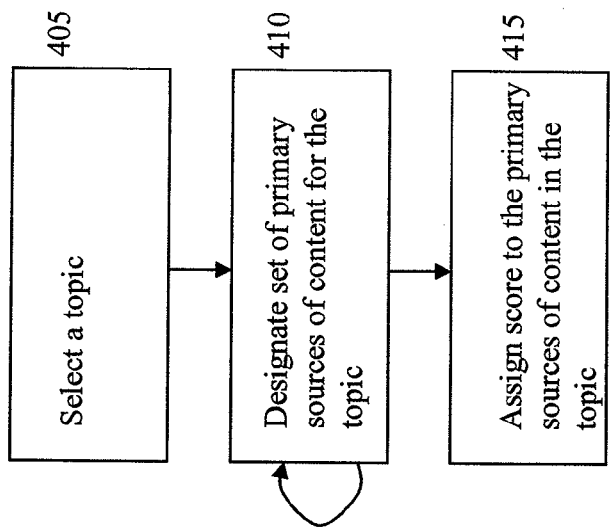
FIG. 4A depicts steps performed in designating and scoring primary sources of content in a given topic in accordance with an embodiment of the system.

In accordance with one embodiment of the invention, as shown in FIG. 4a, a topic corresponding to a particular subject matter or a community of interest is selected (405) and assigned (410) a set of trusted or primary sources of content. These primary sources may be designated by an editor or other user of the system to define the types of content that are of greatest relevance or quality to the user or community of interest. The primary sources of content may be any of the different types of sources of content including feeds. Scores are assigned (415) to the primary sources. The scoring engine (60) scores the primary sources based on criteria including the degree of overlap with other primary sources, the degree of overlap with the topic as a whole, and whether a given primary source expresses similar patterns of trust or distrust to items in the selection network repository as other primary sources. This scoring step is optional, in which case each primary source would be considered, in the first instance, to have an equivalent score. Alternatively, an editor or other user of the system could designate scores to one or more of the primary sources, to change the relative level of trust implied to a given primary source. Also, a keyword search of the sources in the selection network repository (50) could be used to identify a set of primary sources.

According to a preferred embodiment, the scoring engine (60) scores the primary sources based on the degree to which the primary sources are representative of the set of URLs in the topic. To do this, the system identifies the set of individual links in the topic, referred to as the topic linkset, by identifying the links associated with the sources of content. According to one embodiment the topic linkset includes the links (222) found in the entries of the primary sources of content. This includes all primary sources of content, and may, in accordance with one embodiment, include user feedback feeds. In some circumstances, links (223) that are not found in the entries of the primary sources, but rather are found in the items referenced by the primary sources, are also included in the topic linkset. Specifically, when there is a reason to believe that an item (e.g. html page 230) was created by the same author as the feed (200) to which the item is associated, then links (223) found in that item may be included in the linkset. In a preferred embodiment, if the host name corresponding to an item (e.g. html page 230) overlaps with a high percentage (e.g. 90%) of the host names of the links found in the other entries of the feed, then the system will attribute links (223) to the feed (200) and to the entry (220) that corresponds to the item. The relevant overlap percentage can vary considerably based on the characteristics of the feed and its entries. Because these links are imputed to an entry contained in the primary source, they are included in the topic linkset. Having identified the set of links in the topic or topic linkset, the system determines how many members of the linkset are found in each of the sources of content and scores the sources accordingly.

In some circumstances, it may be desirable to exclude certain links (223) from the linkset. For example, a link (223) that is repeated in multiple pages (230) corresponding to multiple entries (220) that are successive or in close proximity to one another, in a feed (200) may be indicative that the link relates to navigation on the website, to an advertisement, or to some other item that is not of particular value or relevance to the topic. In one embodiment, the system (5) employs a heuristic, detecting links that appear in more than 35 percent of the entries between the first and last entries, inclusive, in which the link appeared in the feed, and excludes such links from the linkset.

In one embodiment feeds within the topic are scored relative to other feeds in the topic. This scoring is based on a simple measure of overlap: if Feed A ever links to anything that Feed B also links to, Feed A and Feed B overlap. The basic calculation is to count the percentage of feeds in the topic that a given feed overlaps with (including itself). Thus if only one feed is in the topic, then it has a score of 100% (because it overlaps with 1 out of 1 feeds in the topic). This basic calculation is further refined by iteratively calculating scores of feeds weighted by the scores of feeds that it overlaps with. Thus if a Feed A overlaps with Feed B, that overlap with Feed B counts more if Feed B itself overlaps with more feeds. The weighting calculated as follows: an initial 'seed' set of scores are calculated based on straight, unweighted percentage of feeds another feed overlaps with. So if there are 4 feeds in the topic, and a feed overlaps with another feed and itself, it would have a score of 0.5. If it overlapped with just itself it would have a score of 0.25. A feed can only have a score of zero if it has no links at all (resulting in no overlap even with itself). Once these initial scores are calculated, they are re-calculated iteratively until the values stabilize. The iterative calculation adds up the scores of all the feeds in the topic as a total possible score. So if 4 feeds are in the topic with scores of 1.0, 0.75, 0.5 and 0.5 the total possible score is 2.75. Then for each feed in the topic it adds up the scores of all the feeds it overlaps with (including itself). The new score for the feed is then the ratio of its total score over the total possible score. So a feed that overlaps with the feeds with scores 1.0 and 0.75 would have a score of 1.75/2.75 or 0.6364. This round of scores is saved, and the process is repeated until the total possible score for the topic stabilizes. In one instance 'stabilization' is detected as the point where the direction of change in the value reverses. (e.g. if the value was going up, the iterations stop when the value starts going down.) In this instance, the number of iterations was limited to 10. A benefit of this iterative approach is that it makes the recommended set scores (which are also weighted based on in-topic feed scores) relative to the in-topic feed scores. As a result both lists can be unioned together into a single ranked set. In addition, it adds consistency to the scoring, such that the score of a recommended feed not already in the topic, will be the same or slightly higher if it is added to the topic.

To provide a more expansive set of potential selections, the system defines a recommended or secondary set of sources of content and generates a scored set of URLs or links that permit the prioritization of selections. According to one embodiment, as depicted in FIG. 4b, a topic is selected (420), and the system identifies (425) the sources of content not in the topic but stored in the selection network repository (50) that overlap with any of the links in the topic linkset. A source of content overlaps the topic linkset if the linkset for that source of content includes any link that is also in the topic linkset. The system employs well-known normalization techniques to identify multiple variants that refer to the same Internet resource as the same URL. The system assigns (430) scores to the overlapping sources of content that are not in the topic. In a preferred embodiment, the score is based on the amount of overlap with the primary sources, the number of primary sources with which the source of content overlaps, and the extent to which the source of content overlaps the primary sources individually.

A subset of prioritized sources of content is selected (435) to form the recommended or secondary set of sources of content. The secondary set of sources may be defined to be a predetermined number of the highest-ranking sources of content. Alternatively, the recommended set may be defined to be all sources of content that score above a predetermined threshold score.

Using the primary set and the secondary set of sources for the topic, the scoring engine (60) next selects (450) the set of URLs or links in the linkset of the primary sources (i.e. the topic linkset), and the linkset of the secondary sources. The linkset of a secondary source may be identified in similar fashion to the linkset of a primary source as discussed above. In one example, the linkset includes links found in the entries of the source and links contained in items that show evidence of having been authored by the same source, such as links having a common host name or other whose metadata includes an indicator suggesting a relationship between the links. In accordance with a preferred embodiment, the score of a URL is determined by adding the scores of each of the primary and secondary sources that links to the URL.

Figure 4C:
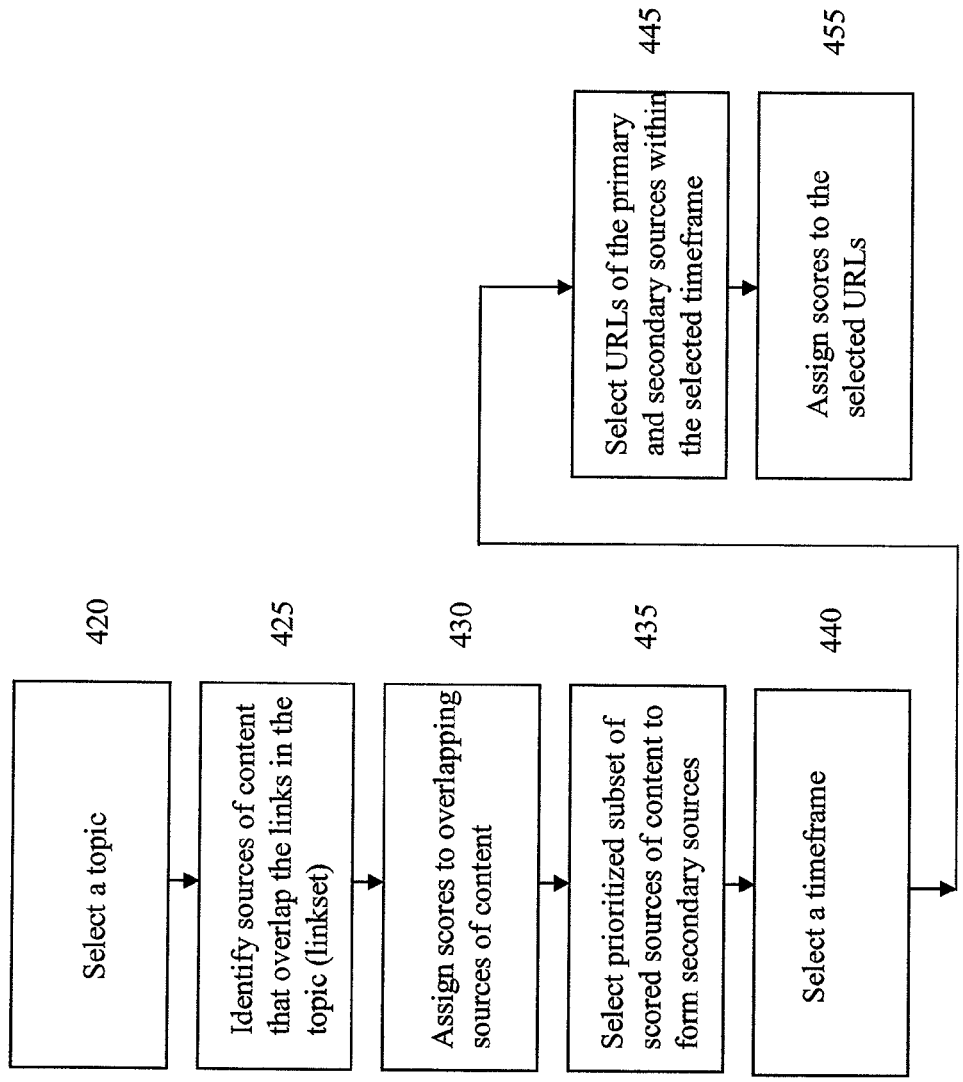
FIG. 4C depicts steps performed by the scoring engine in accordance with another embodiment of the system.

Over time, the number of URLs in the primary and secondary sets may become expansive. In accordance with a preferred embodiment, the scoring engine narrows the focus to a specific timeframe as depicted in FIG. 4c. The scoring engine (60) receives a selected topic (420) and performs steps (425), (430), and (435) as previously described. Next, a specific timeframe is selected (440), to narrow the focus of scoring. The timeframe may be selected by a user using a user interface to the system, or may be selected by the system itself, which may elect to score URLs that were added in a specific time window. Examples of such time windows would include the most recent hour, day, week, month, quarter, year, but can also be defined as an interval between any two points in time. Using the selected timeframe, the scoring engine selects (445) the URLs of the primary and secondary sources corresponding to that timeframe. Preferably, the time corresponding to a URL is determined by the time at which the URL was first added to a source of content. Alternatively, the time corresponding to the URL may be assigned by the selection acquisition subsystem (40) at the time the URL and the entry from which it originated is entered into the selection network repository (50). The scoring engine then assigns (455) scores to the URLs of the selected timeframe in the manner described above.

In one example, the recommended set of feeds is identified and scored using a method similar to the iterative calculation used to weight in topic feed scores. All feeds not in the topic that have overlap with at least one feed in the topic are scored. The score for the out-of-topic feed is the sum of the scores of the in-topic feeds it overlaps with divided by the sum of the scores of all feeds in the topic. This results is a percentage representing the total points the feed scored out of the maximum possible score. This calculation is not done iteratively as the scores of out-of-topic feeds do not affect the result. Once the scores are calculated, all feeds with a score above a minimum threshold, which may be set at 0.05 are cached with a score in the database. After recommended feeds are scored, duplicate feeds are removed from the recommended set. This is done by looping over the feeds in the secondary set, and for each one looking for a duplicate feed in the database. If the feed is a duplicate of any previous feed in the recommended set it is removed. This way the first (and highest rated) feed is kept, while any subsequent duplicates are removed. Duplicate feeds are detected and marked via a separate process that looks at the entry link URL's held in common between two feeds during the same timeframe. If the number of entry links in common is over a certain threshold (e.g. 90%) the feeds are deemed to be duplicates.

Recommendation Engine

The recommendation engine (70) generates a set of recommended selections comprising links to content that has been selected for a particular topic and metadata describing this content. This set of recommended selections may be generated in response to a request from a user, website, or service. The recommendation engine may also generate sets of recommendations according to a predefined schedule.

Figure 5:
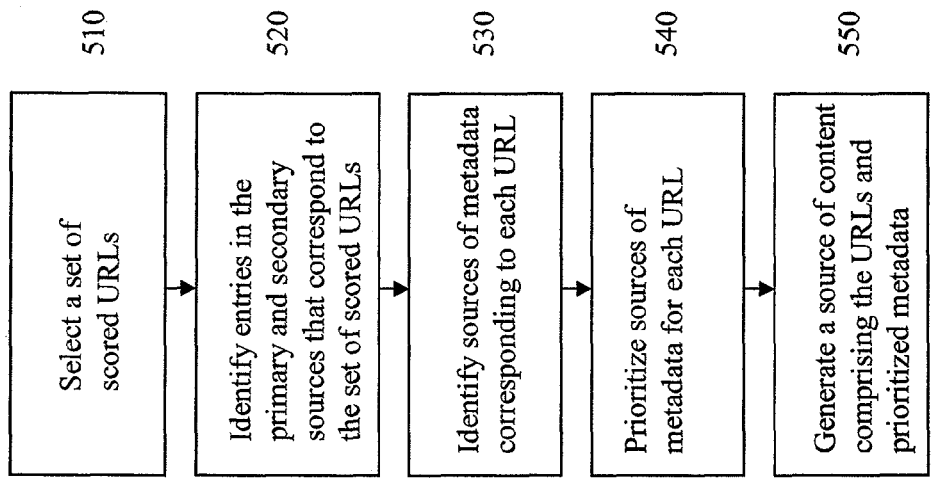
FIG. 5 depicts steps performed by the recommendation engine in accordance with an embodiment of the system.

As depicted in FIG. 5, the recommendation engine (70) selects or receives (510) a set of scored URLs scored by the scoring engine (60). The recommendation engine identifies (520) the entries in the primary and secondary sources that correspond to the set of scored URLs in order to identify (530) sources of associated metadata. For each URL, the recommendation engine (70) prioritizes (540) the sources of metadata. In accordance with a preferred embodiment, the prioritization process operates as follows. If a particular URL is actually present in the entry, as illustrated by the example of html page 230 of FIG. 2b, then the recommendation selects the metadata of that entry. If, on the other hand, the URL is not present in, but is merely associated with a particular entry, then the recommendation engine (70) will prioritize the metadata of an entry that actually contains the URL over one that does not. In the event that there is more than one entry associated with a given URL, all of which or none of which contain the URL, then the recommendation engine (70) will select the metadata from the entry whose source of content has the highest score. In the event of a tie, the recommendation engine (70) will select the metadata of the most recent entry to be associated with the URL.

Combining the URLs and their corresponding prioritized metadata, the recommendation engine (70) assembles the URLs and metadata into entries that form a source of content. In accordance with a preferred embodiment, the recommendation engine (70) generates an RSS feed, a web page, or an email that is tailored to a topic. The recommendation engine (70) may optionally provide additional features. In one example, the recommendation engine (70) is configured to generate an RSS feed containing only a predetermined number of the highest ranking items for a given topic. In another example, the recommendation engine (70) is configured to generate an RSS feed containing only items that are the most recent, and to provide a timestamp indicating the relative age of each item.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

The system (5) may also merge one or more generated sources of content together. This application is particularly useful for a content author or publisher of a feed who wishes to augment his or her own feed with additional trusted content related to the topic. One or more editors can combine sets of tags/entries or feeds to support freelance editing. The system (5) can receive these primary trusted sources of data and generate a topic around the content developed by the editors. Combinations may be packaged to deliver multiple sources of generated content that can be displayed side-by-side to the user.

The system (5) is applicable to allow targeted advertising and to match advertisers to audiences. Internet advertising typically compensates online publishers based on page viewings and click-through events. Internet advertisements, like other content processed by the system, typically contains a link and metadata regarding the link. A set of advertisements representing feed elements may be combined into a feed and added to a given topic. Each entry or its corresponding link is scored by the system in the same fashion as any other source of content. At the same time, the creators of the advertisements may specify the price they are willing to pay to the publisher for showing ads and the price they are willing to pay to those who can get users to click on the ads. Using the scores of the feeds as a proxy for the probability that a user will access them, the recommendation engine (70) may process the highest ranking feeds by multiplying the probability of access by the price that an advertiser will pay for such accesses to generate a set of advertisements prioritized by value. Additionally, when users click on an advertising link, this action may be captured in the user feedback feed, which will enable the system to better target advertisements to their likely audience.

The recommendation engine (70) may employ a variety of filters to selectively provide recommended selections of a particular type. In one example, the system (5) may select only those recommended selections containing photos or image data, producing a set of prioritized and trusted images related to the topic. In another example, the system (5) may filter to select entries that contain audio data. In accordance with this embodiment, the system (5) may filter out all entries that do not contain audio data or video data, resulting in a "best of" collection of audio data, such as a set of recommended podcasts for the topic. In this embodiment, the output of the system (5) may be a podcast. This filtering process may be generally applied to a set of scored links associated with any set of sources of content as to permit prioritization. Because the system (5) captures metadata which may include the duration of the audio or video data files, and because the system may determine the duration of the audio data files using the size of the files, the system (5) may use this duration information to select a prioritized set of audio data of a given total duration. This capability permits a user to specify a duration and to receive a recommended podcast of the desired duration, or of less than the desired duration. Similarly, the system (5) may select only those recommended selections that originate in one or more designated web-sites, producing a prioritized set of content from those sites related to the topic. The system (5) may also filter the recommended selections using key words, thereby producing a prioritized set of recommendations containing the desired keywords. These and other filters based on sets of criteria of interest to the user or editor can be applied to the system.

Because the recommendation engine (70) may access the scores that have been assigned to feeds and authors, this information may be used to generate other useful output, including a recommended set of high-scoring, and therefore trusted, authors or sources of content corresponding to a given topic. Because the user feedback feeds are scored, the recommendation engine (70) may be used to generate a set of the user feedback feeds having the highest scores. High user scores can be helpful for identifying users that are the most trustworthy.

Figure 6:
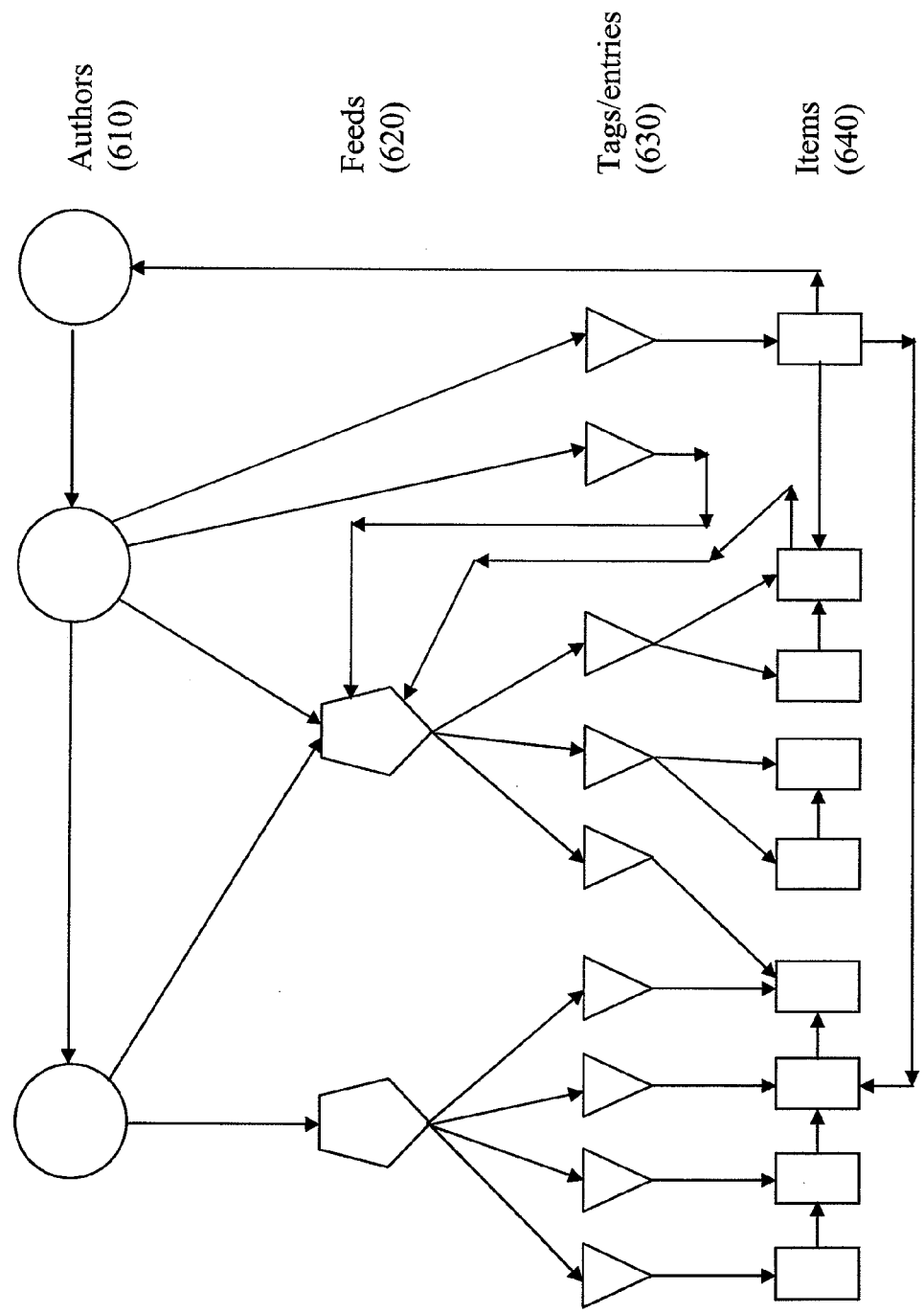
FIG. 6 depicts a set of authors, sources of content, entries, and items, and their relationships to one another in accordance with an embodiment of the system.
Figure 7:
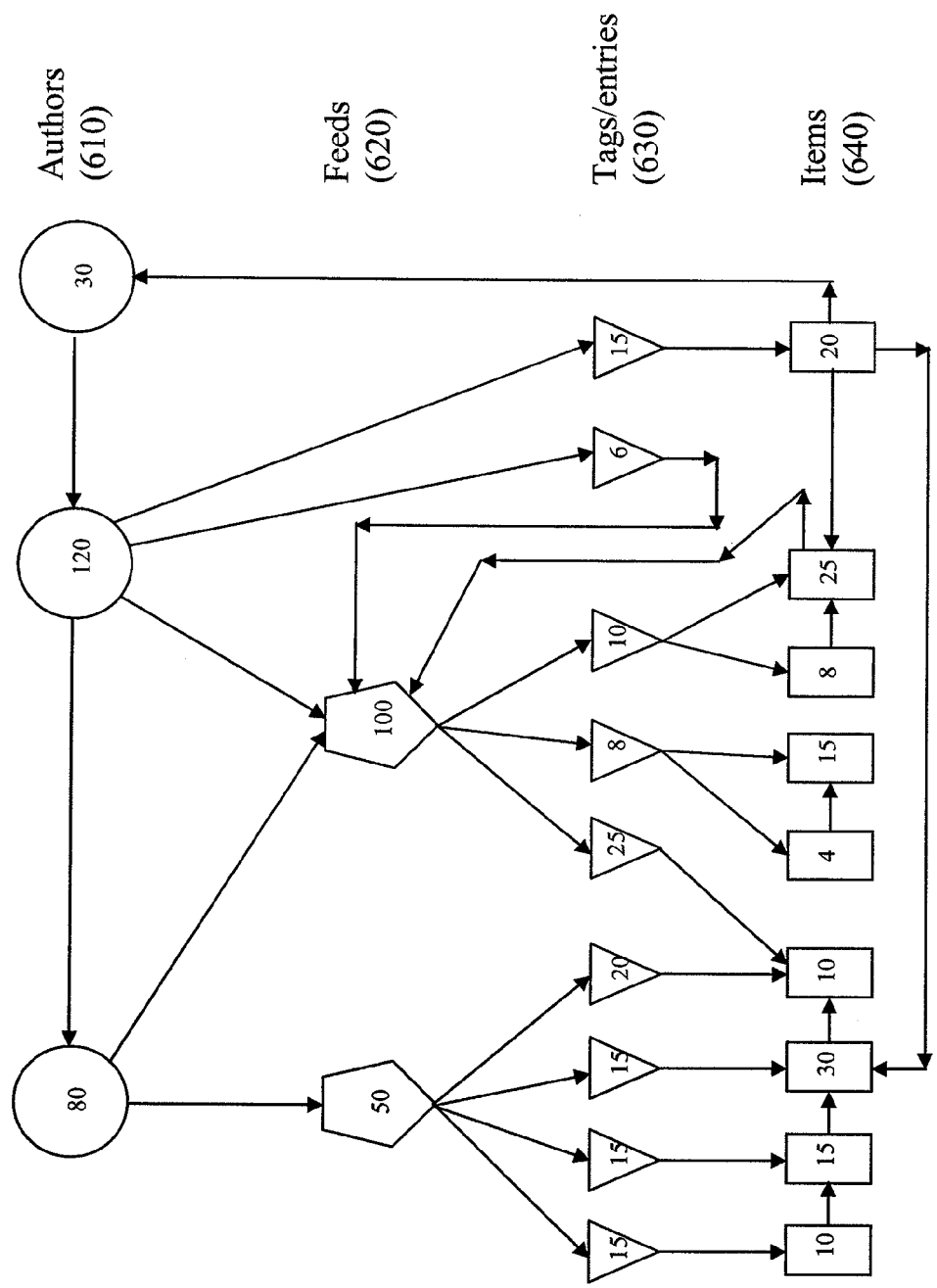
FIG. 7 depicts a set of scored authors, sources of content, entries, and items, and their relationships to one another in accordance with an embodiment of the system.

In a given topic, the set of sources, with their authors, entries, links, and linksets can be thought of as a network. In a simplistic model, there is one imputed author for each source of content. However, the authorship relationship can be more complex, as seen in FIG. 6. Authors (610) may correspond to actual human beings who are represented in the system by metadata that identifies them, but may also correspond, in some instances, to a website which is considered the "author" of all the content found on that site. Authors are linked to the content they have authored. As elements of the network that is stored in the network selection repository (50), authors may also be scored. Authors may be scored, as depicted in FIG. 7, which replicates the authors (610), feeds (620), tags or entries (630) and items (640) of FIG. 6 and depicts scores assigned to each author, feed, entry, and item. The authors scores may be manually assigned by an editor. Alternatively, author scores may be determined based on the scores of the content they have authored, and indications of trust or distrust that are captured by the system. In a system employing the construct of authors, an author may be considered a source of content, where adding an author to a topic imports a subset of the content attributed to that author into the selection network repository.

All of the systems and methods disclosed and claimed herein can be made and executed without undue experimentation in light of the present disclosure. While the systems and methods of this invention have been described in terms of preferred embodiments, it will be apparent to those of skill in the art that variations may be applied to the compositions and/or methods and in the steps or in the sequence of steps of the methods described herein without departing from the concept, spirit and scope of the invention. More specifically, it will be apparent that a system or subsystem that is described in terms of a program could be implemented as an ensemble of programs or services that interoperate to achieve the same results. Similarly, the structure and design of the tables of the selection network repository (50), like the design of many databases, is a design choice subject to cost and performance tradeoffs, and various known methods of implementation are understood to be within the scope of the invention. All such similar substitutes and modifications apparent to those skilled in the art are deemed to be within the spirit, scope and concept of the invention as defined by the appended claims.

REFERENCES

The following references, to the extent that they provide exemplary procedural or other details supplementary to those set forth herein, are specifically incorporated herein by reference.

Provisional application Ser. No. 60/725,726 filed Oct. 11, 2005, of Nathan Matthew Cohen, entitled "System and Method for Indexing a Network of Interrelated Elements," the entire contents of which is hereby incorporated by reference as if fully set forth herein.

The invention claimed is:

1. A computer implemented method comprising:
identifying one or more secondary sources of content based at least in part on an overlap of
   one or more links associated with the secondary sources of content, and
   links associated with a set of one or more primary sources of content, wherein
      the overlap indicates an extent to which the secondary sources of content comprise links that are comprised in the set of one or more primary sources of content,
      the links associated with the set of one or more primary sources of content are comprised in a topic linkset, and
      generating the topic linkset comprises
         detecting that a first set of the one or more of the links associated with the set of one or more primary sources of content is not relevant to a topic associated with the topic linkset, and
         excluding the first set of the one or more links from the topic linkset;
assigning primary source scores to primary sources of content in the topic;
assigning secondary source scores to secondary sources of content, wherein said assigning said secondary source scores is based on an amount of overlap of a linkset of the secondary source and the topic linkset;
assigning URL scores to the links associated with the primary and secondary sources of content, wherein the assigning the URL scores comprises
adding scores of each of primary and secondary sources that links to at least one of the links associated with the primary and secondary sources of content; and
generating, based at least in part on the URL scores, a source of content comprising one or more recommended links selected from the links associated with the primary and secondary sources of content.

2. The method of claim 1 further comprising:
generating a source of user content comprising links previously referenced by a user.

3. The method of claim 2 wherein the source of user content comprises user feedback.

4. The method of claim 1 wherein at least one of the primary or secondary sources of content is an RSS feed.

5. The method of claim 1 wherein at least one of the primary or secondary sources of content is one or more of: a web page or a podcast.

6. The method of claim 1 wherein at least one of the links associated with the primary or secondary sources of content is a Uniform Resource Locator (URL).

7. The method of claim 1 wherein the generated source of content further comprises metadata relating to the recommended links.

8. The method of claim 1 further comprising:
filtering the generated source of content to include links associated with a predetermined time interval.

9. The method of claim 8 wherein the generated source of content comprises an email message.

10. The method of claim 8 wherein:
the set of one or more primary sources of content are received as a user input defining a topic;
the generated source of content is comprised in an output; and
the generated source of content comprises an RSS feed.

11. A system comprising:
a general purpose computing device;
a computer memory, having stored thereon computer program instructions executable by the computing device, wherein the computer program instructions are executable to cause the computing device to
identify one or more secondary sources of content based at least in part on an overlap of
one or more links associated with the secondary sources of content, and
links associated with a set of one or more primary sources of content, wherein
the overlap indicates an extent to which the secondary sources of content comprise links that are comprised in the set of one or more primary sources of content,
the links associated with the set of one or more primary sources of content are comprised in a topic linkset, and
generating the topic linkset comprises
detecting that a first set of the one or more of the links associated with the set of one or more primary sources of content is not relevant to a topic associated with the topic linkset, and
excluding the first set of the one or more links from the topic linkset;
assign secondary source scores to secondary sources of content, wherein said scoring is based on amount of overlap of linkset of the secondary source and the topic linkset of the primary sources;
assign URL scores to the links associated with the primary and secondary sources of content by adding the scores of each of primary and secondary sources that links to the URL; and
generate, based at least in part on the URL scores, a source of content comprising one or more recommended links selected from the links associated with the primary and secondary sources of content.

12. The system of claim 11 wherein:
at least one of the primary or secondary sources of content is an RSS feed; and
the generated source of content further comprises metadata relating to the recommended links.

13. A computer-readable storage device having computer-executable instructions stored therein, wherein the instructions are executable by a computer to perform the acts of:
identifying one or more secondary sources of content based at least in part on an overlap of
one or more links associated with the secondary sources of content, and
links associated with a set of one or more primary sources of content, wherein
the overlap indicates an extent to which the secondary sources of content comprise links that are comprised in the set of one or more primary sources of content,
the links associated with the set of one or more primary sources of content are comprised in a topic linkset, and
generating the topic linkset comprises
detecting that a first set of the one or more of the links associated with the set of one or more primary sources of content is not relevant to a topic associated with the topic linkset, and
excluding the first set of the one or more links from the topic linkset;
assigning secondary source scores to secondary sources of content, wherein said scoring is based on amount of overlap of linkset of the secondary source and the topic linkset of the primary sources;
assigning URL scores to the links associated with the primary and secondary sources of content by adding the scores of each of primary and secondary sources that links to the URL; and generating, based at least in part on the URL scores, and
generating, based at least in part on the URL scores, a source of content comprising one or more recommended links selected from the links associated with the primary and secondary sources of content.

14. The computer-readable storage device of claim 13 wherein the computer-executable instructions are further operative to cause the computer to perform the act of
filtering the generated source of content to include links associated with a predetermined time interval.

15. The computer-readable storage device of claim 14 wherein the generated source of content comprises one or more of: an RSS feed or a web page.

16. The computer-readable storage device of claim 13 wherein:
the one or more links associated with the secondary sources of content comprise links within the secondary sources of content, and
the links associated with the set of one or more primary sources of content comprise links within the one or more primary sources of content.

17. The method of claim 1 wherein the source scores assigned to the secondary sources of content are based at least in part on the overlap.

18. A system comprising:
a processor configured for identifying one or more secondary sources of content based at least in part on an overlap of
one or more links associated with the secondary sources of content, and
links associated with a set of one or more primary sources of content, wherein
the overlap indicates an extent to which the secondary sources of content comprise links that are comprised in the set of one or more primary sources of content,
the links associated with the set of one or more primary sources of content are comprised in a topic linkset, and generating the topic linkset comprises
   detecting that a first set of the one or more of the links associated with the set of one or more primary sources of content is not relevant to a topic associated with the topic linkset, and
   excluding the first set of the one or more links from the topic linkset;
means for assigning primary source scores to the one or more primary sources of content;
means for assigning secondary source scores to secondary sources of content, wherein said scoring is based on amount of overlap of linkset of the secondary source and the topic linkset of the primary sources;
means for assigning URL scores to the links associated with the primary and secondary sources of content by adding the scores of each of primary and secondary sources that links to the URL; and
means for generating, based at least in part on the URL scores, a source of content comprising one or more recommended links selected from the links associated with the primary and secondary sources of content.

19. The method of claim 1, wherein the assigning the source scores to the secondary sources of content comprises an iterative evaluation of the secondary sources of content.

* * * * *